United States Patent [19]

Harvey

[11] 4,374,904
[45] Feb. 22, 1983

[54] TIN-BASE BODY SOLDER

[75] Inventor: Douglas J. Harvey, Sterling Heights, Mich.

[73] Assignee: General Motors Corporation, Detroit, Mich.

[21] Appl. No.: 368,429

[22] Filed: Apr. 14, 1982

Related U.S. Application Data

[62] Division of Ser. No. 160,135, Jun. 16, 1980, which is a division of Ser. No. 113,559, Jan. 21, 1980, Pat. No. 4,248,905.

[51] Int. Cl.³ .............................................. C22C 13/00
[52] U.S. Cl. .................................... 428/648; 420/560
[58] Field of Search .............. 75/175 R, 178 CT, 157; 428/648

[56] References Cited

U.S. PATENT DOCUMENTS

| | | | |
|---|---|---|---|
| 1,437,641 | 12/1922 | Ferriere et al. | 75/175 R |
| 1,567,396 | 12/1925 | Schwalm | 75/175 R |
| 2,473,886 | 6/1949 | Hull | 75/175 R |
| 3,925,110 | 12/1975 | Prematta et al. | 75/175 R X |

Primary Examiner—L. Dewayne Rutledge
Assistant Examiner—David A. Hey
Attorney, Agent, or Firm—Douglas D. Fekete

[57] ABSTRACT

In the preferred embodiment, a method is presented for filling depressions in fabricated steel surfaces by applying a metallic body solder consisting of 15 to 20 weight percent copper, 2 to 3 weight percent zinc and the balance tin. The body solder alloy is heated to a temperature above about 210° C. to form a workable thixotropic paste that is applied with spreading onto the steel surface. Upon cooling, the body solder forms a dense, tightly adherent fill that is grindable and paintable in conjunction with the surrounding steel surface.

4 Claims, 1 Drawing Figure

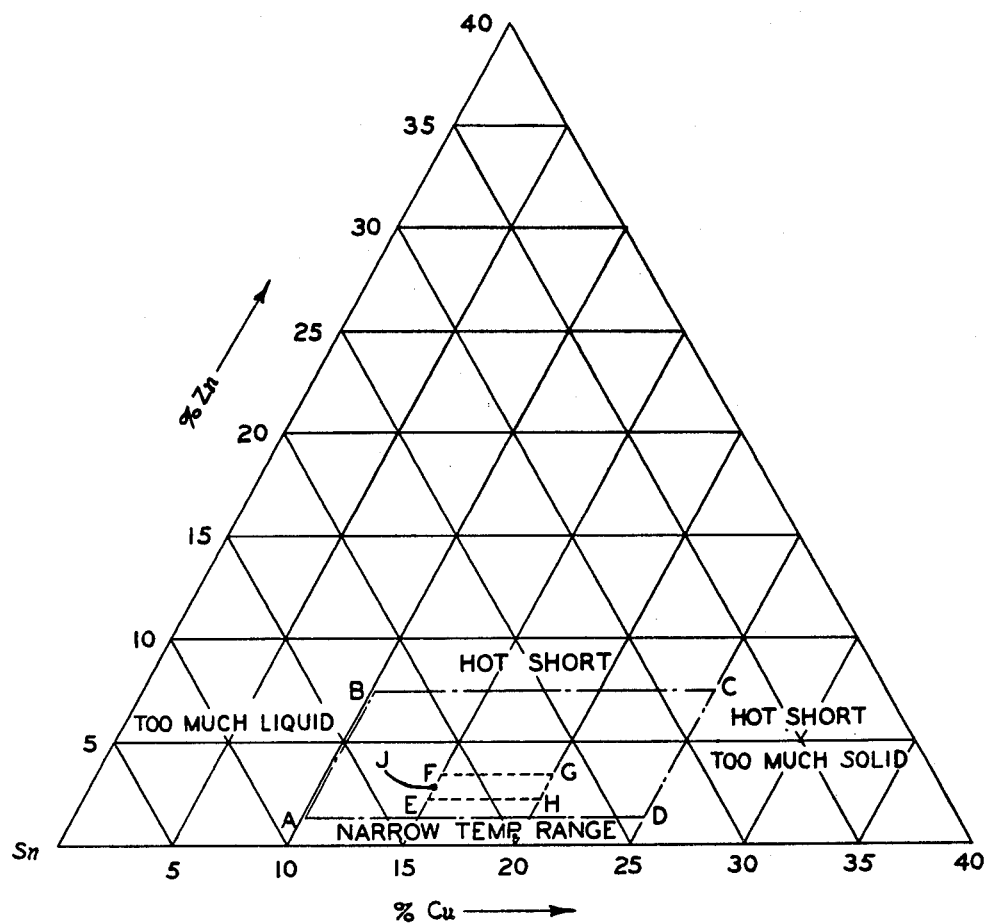

TIN-BASE BODY SOLDER

This is a division of application Ser. No. 160,135, filed June 16, 1980, which is a division of application Ser. No. 113,559, filed Jan. 21, 1980, now U.S. Pat. No. 4,248,905.

BACKGROUND OF THE INVENTION

This invention relates to a lead-free metallic body solder and, more particularly, to a tin-base body solder containing copper and zinc.

Body solder is traditionally a metal alloy adapted for application to a fabricated steel or other metal surface to fill depressions therein and thereby form a smooth decorative surface. For example, in the automotive industry and elsewhere, body solder is used to fill a depression designed about a welded seam or to repair a dent. Heretofore, a lead-base alloy containing tin or antimony was used as a body solder because it was capable of being conveniently applied. When moderately heated, the alloy partially melts to form a workable paste that is readily spreadable onto a steel surface using an oiled wooden paddle and hand applied pressure. The workable paste is formed over a wide temperature range, which substantially enhances its spreadability. After being applied and upon cooling, the alloy forms a dense, tightly adherent fill having a surface adapted for finishing by grinding and printing in conjunction with the surrounding steel surface. Although the lead-base alloy is generally adequate as a body solder, the use of lead requires careful handling in the plant environment and is being reduced.

Therefore, it is an object of this invention to provide a metallic body solder requiring no lead content, which solder is adapted to be heated and applied as a workable paste to suitably fill depressions in a fabricated steel surface in a manner similar to traditional lead-base body solders. The body solder exhibits good adhesion, good grindability and good paintability, comparable to the lead-base solders.

It is a more particular object of this invention to provide a body solder alloy composed predominantly of tin and containing copper and zinc, but no appreciable lead. The alloy forms a spreadable thixotropic paste when heated to within a broad range of moderately elevated temperatures. The paste is suitable for spreading onto a steel surface without heat damage and, upon cooling, bonds thereto. In addition, the solder is capable of providing a paintable surface that resists sagging or flowing at typical curing temperatures.

It is also an object of this invention to provide a method of filling depressions in a fabricated steel surface prior to painting, which method includes heating a tin-base copper-zinc alloy to within a broad range of moderately elevated temperatures to form a spreadable paste. The paste is suitably applied to the depression without heat damage to the steel and, upon cooling, bonds thereto. The filled surface is suitable for painting, in accordance with conventional steel surface painting practices, and remains intact during paint curing.

SUMMARY OF THE INVENTION

In the preferred embodiment, a method is provided for filling depressions in a fabricated steel surface comprising applying thereto, as a body solder, an alloy consisting of 15 to 20 weight percent copper (Cu), 2 to 3 weight percent zinc (Zn) and the balance tin (Sn) and containing no lead (Pb). The body solder alloy is applied as a workable thixotropic paste formed by heating to a temperature above about 210° C. Under these conditions, this specific family of alloys exhibits a paste consistency similar to molding clay or plaster. The paste comprises sufficient liquid to render the paste spreadable without excessive force, but there is not too much liquid which would permit the solid and liquid phases to separate, a condition known as eutectic separation or bleed. Although a spreadable paste is suitably formed at temperatures as high as 385° C., the paste is preferable applied to the steel surface at about 270° C. or lower to avoid oxidation or other heat damage to the steel.

The body solder alloy is preferably manufactured in a bar shape for convenient handling and application. A homogeneous Sn-Cu-Zn melt is cast and rapidly cooled to form a generally cylindrical ingot. The cooling rate is preferably between about 10° to 100° C. per second and results in a dendrite secondary arm spacing between about 1.0 to about 10 microns. The ingot is thereafter extruded into the preferred bar shape. Extrusion is preferably carried out at about room temperature and involves a reduction in diameter of at least 4:1. It has been found that rapid cooling and mechanical working of the cast alloy significantly affects its paste-forming properties so that, when heated, the extruded bar more readily forms the desired spreadable thixotropic paste.

The fabricated steel surface is suitably prepared by cleaning, fluxing and tinning. Although the Sn-base alloy is self-tinning, the steel surface is preferably tinned prior to filling to reduce the application time and minimize the amount of alloy required. Tinning is suitably carried out concurrent with fluxing by applying to the cleaned surface a mixture containing a powder of the preferred Sn-Cu-Zn alloy and a zinc chloride-type flux, heating to melt the alloy, and removing any excess by wiping. The body solder bar is selectively heated at one end to form the paste, while being handled at the other. Formation of the paste is evidenced by a noticeable softening of the alloy. The paste is then spread onto the tinned surface with a suitable utensil, such as a wood paddle. After cooling, the body solder forms a dense, void-free fill that tightly bonds to the adjacent steel. The surface is finished by grinding. The claimed alloy has good feathering characteristics so that the edges of the fill surface merge smoothly with the surrounding steel surface. The smooth fill surface is suitably painted in conjunction with the surrounding steel surface and without special pretreatment. The body solder fill retains its shape even when heated to a temperature as high as about 200° C. during conventional curing of the paint coat.

The good spreading properties of the thixotropic paste are an important feature of this invention. The Sn-base alloy contains Cu and Zn in proportions suitable for forming the workable paste over an improved broad range of temperatures so that the paste remains workable for a suitable time after the heat source is removed. This temperature range includes suitable low temperatures to enable filling without heat damage to the steel surface. The heated paste is suitably plastic for spreading without hot shorting, a term of art referring to the tendency of a body solder material to fracture rather than flow during spreading. It is not unacceptably stiff or brittle. Also, the thixotropic paste retains the desired shape after spreading and is not too liquid so as to flow or sag before solidifying. Furthermore, the paste acceptably adheres to the steel surface without sticking to the preferred wooden applicator.

Thus, the Sn-Cu-Zn body solder alloy of this invention possesses a surprising combination of properties that render it particularly suitable as a replacement for conventional Pb-base body solders. For application, the Sn-Cu-Zn solder forms a spreadable paste at slightly elevated temperatures suitable for steel surfaces. Upon solidifying, the alloy forms a dense, tightly adherent fill that is grindable and paintable. Therefore, steel surfaces are suitably filled with the Sn-base body solder by a method similar to the conventional method with the Pb-base alloy. However, the preferred body solder alloy is formed of Sn, Cu and Zn, making it relatively safe for handling and use in a typical working environment.

DESCRIPTION OF THE DRAWINGS

The only FIGURE is a portion of the Sn-Cu-Zn tertiary compositional graph depicting Sn-base alloy compositions containing up to 40 weight percent Zn and up to 40 weight percent Cu. Regions A-B-C-D and E-F-G-H marked in the FIGURE represent those alloy compositions suitable and preferred, respectively, for body solder use in accordance with this invention.

DETAILED DESCRIPTION OF THE INVENTION

In accordance with the preferred embodiment of this invention, a Sn-Cu-Zn alloy was prepared for use as a body solder. The alloy consisted of 82.5 weight percent Sn, 15 weight percent Cu and 2.5 weight percent Zn. The metallic Sn was first heated in a clay-graphite crucible well above its melting point to about 550° C. To dissolve the high melting Cu in the Sn melt, a flux comprising zinc chloride was added to the crucible in a sufficient amount to completely cover the melt surface. Thereafter, the required amount of solid Cu-metal was added to the crucible. The flux improves the wetting of the solid Cu by the Sn melt and thereby substantially increases the dissolution of the Cu. After the Cu had completely dissolved, the zinc chloride flux was skimmed from the melt surface and the required amount of metallic zinc was simply dissolved into the Sn-Cu melt.

The homogeneous Sn-Cu-Zn melt was cast into a water-cooled copper mold comprising a cylindrical cavity that was 25 mm in diameter and 100 mm in length. Water was circulated through the mold to rapidly cool the melt at a rate of about 25° C. per second. After cooling to room temperature, the cylindrical casting was extruded to form a bar having a diameter of about 6 mm and a length of about 400 mm.

The body solder was tested using a dented sheet steel panel. The clean dented surface was prepared by fluxing and tinning. The preferred flux was a commercially obtained acid zinc chloride material comprising, by weight, about 32 percent $ZnCl_2$, about 8.2 to 9.2 percent $NH_4Cl$, about 4.15 to 4.65 percent HCl, and the balance water and thickening agents in an amount to produce a clear, colorless flux having a gel-like consistency. Although fluxing and tinning are suitably performed in separate steps, it is preferred to carry out both in a single step by applying a slurry comprising powder of the preferred Sn-Cu-Zn alloy suspended in the thick acid zinc chloride flux. At least 30 to 50 percent of the powder was finer than 325 mesh, 20 to 40 percent was between 200 to 325 mesh, 10 to 30 percent was between 100 to 200 mesh and not more than 5 percent was greater than 100 mesh. The slurry was applied generously to the clean surface by brush and heated with a direct flame to cause the powdered alloy to melt and wet the steel. The excess was then removed by wiping with a suitable cloth.

While holding one end of the extruded body solder bar in one hand, the free end was heated using an open natural gas flame, whereupon the alloy formed a spreadable paste. The formation of the paste was evidenced by a noticeable softening of the alloy, including a bending of the bar. The paste was thereafter applied to the fluxed and tinned dented surface by holding the bar near the surface and spreading the thixotropic paste into the dent with the aid of an oiled maple paddle.

After cooling, the Sn-base alloy formed a crack-free fill that tightly bonded to the adjacent steel. The fill surface was suitably finished by grinding and displayed good feathering, which is the ability to grind the fill progressively thinner at the edges. Feathering enables the fill surface to be blended into the surrounding steel surface to create a smooth surface that is not discernable after painting. The smooth fill-steel surface was then painted in accordance with conventional practices to form a decorative finish. The paint was baked at a temperature of about 185° C. with no observable sagging of the body solder.

Good spreadability depends to some extent on the preferences of the particular practitioner. However, the preferred alloy paste exhibited many properties generally desirable in body solder work. The paste adhered well to the steel surface, but not appreciably to the oiled maple paddle. Also, it exhibited a desired smooth consistency like molding clay, in contrast to the gritty consistency like sand in water. This smooth consistency is obtained when liquifying produces many fine solid particles that are suitably suspended in the liquid phase, rather than fewer large particles that tend to precipitate. It has been found that the ability of the alloy to produce the smooth paste is substantially improved by rapidly cooling and mechanically working the casting. The thixotropic paste flowed in response to hand applied pressure, and retained its shape thereafter. Neither hot shorting nor eutectic bleed were observed.

A series of alloys were prepared for testing in accordance with the aforementioned preferred procedure to determine the effect of variation of the alloy composition on the formation of a spreadable paste. In summary, alloys containing less than about 10 weight percent Cu formed excessive liquid phases and were difficult to handle. An excessive liquid phase was indicated by eutectic bleeding or on-panel running of the paste. Alloys containing greater than about 25 weight percent copper evidenced unacceptable brittleness in the paste that resulted in hot shorting. Hot shorting is typically found in pastes wherein the proportion of the solid phase to the liquid phase is too large. Sn-Cu alloys containing no zinc were difficult to work and frequently squeaked during application, similar to the squeaking produced when Sn metal is deformed at room temperature. Alloys containing less than about 1.0 weight percent zinc formed a paste over an extremely limited temperature range so that it was extremely difficult to control the paste properties during application. Alloys containing greater than about 7.5 weight percent Zn also exhibited unacceptable hot shorting. These results are shown graphically in the FIGURE as the region A-B-C-D. Alloys having compositions falling with the region A-B-C-D formed suitable thixotropic pastes for body solder use.

Within the region A-B-C-D, alloys having compositions falling within region E-F-G-H formed preferred body solder pastes. Alloys within the preferred region were less sticky as indicated by a reduced tendency to cling to the maple paddle. Also, the alloys were less stiff and evidenced a reduced resistance to plastic flow as a result of the applicator force. More particularly, these preferred alloys comprise 15 to 20 weight percent Cu, 2 to 3 weight percent Zn and the balance Sn. The composition of the body solder alloy represented at point J and described in the preferred embodiment has been found to serve as an excellent body solder when applied at a temperature in the range of about 210° C. to 270° C.

Equally important to the spreading properties in the temperature at which the workable paste is formed. The Sn-Cu-Zn body solder melts over a range of temperatures, so that liquid and solid phases coexist in a mushy mixture between the solidus and liquidus temperatures, as is typical of non-eutectic metal alloys. It is theorized that a workable paste comprises about 25 to 50% liquid on a weight basis and that these points, rather than the solidus and liquidus temperatures, determine the useful temperature range of the body solder alloys. The useful temperature range was experimentally determined for the preferred alloy consisting of 15% Cu, 2.5% Zn and the balance Sn. In general, the alloy formed a spreadable paste at about 210° C. and continued to be spreadable up to a temperature of about 385° C. or higher. In view of the subjective nature of the spreadability property, the extreme temperatures represent generalizations and are not intended as a precise limit. However, in general, it has been found that Sn-Cu-Zn alloys preferred for body solder use; i.e., alloys falling in the E-F-G-H region of the FIGURE, become spreadable when heated to near 210° C., which minimum is only slightly affected by differences in the composition.

In the typical practice, the alloy is heated to form the paste and cools when applied and spread. Steel surfaces are damaged when heated to about 270° C., primarily because of oxidation or distortion. However, since the paste is spreadable at temperatures as low as 210° C., it effectively provides a 60° working range. This range is sufficiently broad to enable the practitioner to apply the paste without heat damage to the surface, yet have a reasonable time for spreading. In instances where cooling causes the alloy to stiffen before spreading is complete, the alloy may be carefully reheated on the surface, for example, with an open flame, to reform the paste in situ without heat damage to the surface. It is noted that the body solder alloys of this invention typically form pastes at temperatures up to about 385° C. or higher. In appropriate circumstances, the alloy may be heated to a temperature above steel-damaging and cooled after removal from the heat source to a suitably low temperature for application. Thus, the body solder alloys form spreadable pastes over an improved broad temperature range, which includes a significant portion lying below the steel-damaging temperature.

Another feature of the preferred body solder alloys of this invention is that they retain the desired shape during painting and, more particularly, during baking of the paint coat. Painted steel surfaces are typically baked up to about 200° C.

Thus, although the preferred Sn-Cu-Zn alloys are spreadable at 210° C., they are not so soft at about 200° C. that they sag or flow during paint baking.

In the preferred embodiment, the body solder consisted of Sn, Cu and Zn metals. In the usual practice, the metals are commercially obtained and typically contain impurities, including Pb and arsenic As. Thus, the body solder alloys also typically include these impurities. Preferably, the body solder alloy does not contain more than about 0.1 weight percent Pb, 0.07 weight percent As and 0.1 weight percent other impurities.

Although in the preferred embodiment the body solder was shaped into a bar and selectively heated to form the spreadable paste, it is apparent that the alloy is suitable for application by other techniques, such as from a mush pot, and that its usefulness is not limited to a particular shape. When applying the body solder as a bar, it has been found that rapidly cooling and mechanically working the cast alloy substantially enhances its ability to readily form the paste upon heating. Therefore, for bar application, the casting is cooled at a rate faster than about 1° C. per second and preferably at a rate between about 10° to about 100° C. per second. Suitable cooling is evidenced in the alloy microstructure by a dendrite secondary arm spacing of between about 1 to about 10 microns, although the connection between the dendrite structure and paste formation is not certain. The casting is then suitably extruded at a temperature less than about 150° C. to effect a reduction in diameter of at least 4:1. Alternately, the bar is suitably formed by rolling the casting to subject the alloy to the desired mechanical work.

Although this invention has been described in terms of certain embodiments thereof, it is not intended that it be limited to the above description but rather only to the extent set forth in the claims that follow.

The embodiments of the invention in which an exclusive property or privilege is claimed are defined as follows:

1. A metallic body solder incorporated in a steel surface to fill a depression therein and comprising an alloy consisting essentially of, by weight, between about 10 to 25 percent copper, about 1 to 7.5 percent zinc and the balance tin, said solder forming a dense, paintable surface adherent to said steel body.

2. A metallic body solder incorporated in a steel surface to fill a depression therein and comprising an alloy consisting essentially of, by weight, between about 15 to 20 percent copper, about 2 to 3 percent zinc and the balance tin, said solder forming a dense, paintable surface adherent to said steel body.

3. A metallic body solder comprising an alloy consisting essentially of, by weight, between about 10 to 25 percent copper, about 1 to 7.5 percent zinc and the balance tin, said alloy forming when suitably heated a workable thixotropic paste that is spreadable to fill a depression in a steel body surface and upon cooling form a dense, paintable surface adherent to said steel body.

4. A metallic body solder comprising an alloy consisting essentially of by weight, between about 15 to 20 percent copper, about 2 to 3 percent zinc and the balance tin, said alloy forming a spreadable paste when suitably heated above about 210° C., which paste is spreadable to fill a depression in a steel body surface and upon cooling form a dense, paintable surface adherent to said steel body.

* * * * *